July 31, 1962  TAKIZO KOBAYASHI  3,047,772
HIGH OUTPUT STARTING DEVICE FOR A PREHEATING
TYPE FLUORESCENT LAMP
Filed Oct. 22, 1957

INVENTOR.
TAKIZO KOBAYASHI,
BY
ATTORNEY

United States Patent Office 3,047,772
Patented July 31, 1962

3,047,772
HIGH OUTPUT STARTING DEVICE FOR A PREHEATING TYPE FLUORESCENT LAMP
Takizo Kobayashi, Kawanishi City, Japan, assignor to Keiji Tanaka, Ikoma-gun, Nara Prefecture, Japan
Filed Oct. 22, 1957, Ser. No. 691,715
Claims priority, application Japan Jan. 14, 1957
9 Claims. (Cl. 315—99)

This invention relates to a high output starting device for a preheating type fluorescent lamp.

Economical lighting of fluorescent lamps with respect to lamp currents is being considered today. There is seen a trend toward higher outputs with the increase of lamp currents in fluorescent lamps. It is usual, in increasing the output of a lamp, to first redesign the cathode of the lamp so as to be large enough to fit the lamp current.

An object of the present invention is to provide a high output lighting device of the so-called switch-start type with a starting switch such as a flow lamp or a pull-switch, by which device there is obtained a higher output, that is, a brightness about 50% higher than the conventional one by using a conventional standard fluorescent lamp such as, for example, FL-40 or FL-20 as it is without sacrificing its life.

Another object of the present invention is to provide a starting device by which the stepped simultaneous dimmed lighting of high output lighting and substantially rated output lighting is made possible with only one switch without any additional element.

The present invention will be explained in the following description taken in connection with the accompanying drawings in which:

FIGURE 1 shows an embodiment of the typical circuit of the system according to the present invention and shows an example of a circuit of a high output ballast for obtaining a lamp power of 60 w. from a 200 v. source by using a marketed lamp FL-40 with a glow lamp FG-4P therefor.

Figure 1:
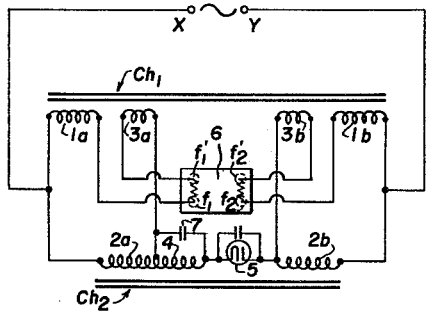
FIGURES 1 to 8 show respective embodiments of the present invention.

The fundamental principle of the operation of the system of the present invention shall be explained with reference to the circuit diagram of this particular embodiment.

Coils $1a$, $1b$, $3a$ and $3b$ of a choke $ch_1$ of a ballast are individually insulated and are wound on a common iron core. Coils $2a$ and $2b$ and an auxiliary coil 4 for starting of a choke $ch_2$ are insulated and wound on the other iron core. When the electric source is passed, the glow lamp will first operate and this circuit will be short-circuited. Consequently, a cathode preheating current component passing through a circuit $x$—$1a$—$f_1$—$f_1'$—$3a$—$4$—$5$—$3b$—$f_2'$—$f_2$—$1b$—$y$ and a shunt current component passing through a circuit $x$—$2a$—$4$—$5$—$2b$—$y$ will flow. At the time of preheating the cathode, as the coils $3a$ and $3b$ are connected with the coils $1a$ and $1b$, respectively, with a minus mutual inductance, the magnetic flux due to the current flowing through the coils $3a$ and $3b$ will act so as to cancel the magnetic flux due to the current of the coils $1a$ and $1b$. Therefore, the impedance of the cathode preheating circuit will decrease and a sufficient cathode preheating current can be obtained.

The mutual inductance for the coils $2a$ and $2b$ of the auxiliary coil 4 in the choke $ch_2$ is connected to be plus. Therefore, at the time of preheating the short-circuited cathode of the glow lamp, the impedance value of the coils $2a$ and $2b$ will temporarily increase due to the plus mutual inductance action by the auxiliary coil 4 and the shunt current component passing through the circuit $x$—$2a$—$4$—$5$—$2b$—$y$ will be remarkably decreased. Therefore, the short-circuited current flowing through the glow lamp 5 can be made equal to the value of the cathode preheating current of the lamp.

Thus, in this embodiment of the circuit, even if the glow lamp for the fluorescent lamp is used as it is, no trouble or difficulty will occur in the life or operation of the glow lamp.

When the cathode preheating current flows and the starting switch 5 is opened, the fluorescent lamp 6 will be lighted by the surge voltage due to $$-L\frac{di}{dt}$$

of the circuit. Thus, respective distributed lamp currents through $x$—$1a$—$f_1$—$6$—$f_2$—$1b$—$y$ and $x$—$2a$—$3a$—$f_1'$—$6$—$f_2'3b$—$2b$—$y$ will be produced.

In these high output lighting devices, it is generally desirable, in the matter of prolonging the life of the lamp, that these distributed currents should be equal to each other and equally distributed. Therefore, the respective impedance values of the impedance elements $1a$, $1b$, $2a+3a$ and $2b+3b$ in the discharge circuit are so selected as to be equal to one another. (In this lighting state, the mutual inductance of the coils $1a$ and $1b$ and the coils $3a$ and $3b$ of the choke $ch_1$ is reversed to be plus, because the direction of the current passing through the coils $3a$ and $3b$, with respect to the current of the coils $1a$ and $1b$, during lighting will be quite exactly reverse to that as of the time of preheating the cathode.)

Therefore, in the device of the present invention, as the arc spot of the filament of the lamp will be produced as distributed equally into two even in the case of high output lighting by the increase of the lamp current, the lamp will not be overloaded and the life of the lamp will not be shortened. It has been experimentally confirmed from the results of various tests for measuring lamp life made by me that, even if the conventional standard lamp as it is lighted in accordance with my invention at a high output by increasing the lamp electric power by about 50%, the rated life of the total lighting time of 7500 hours can be easily obtained in the lamp life test which has been made by the on-off cycle of lighting for 3 hours and extinguishing for 30 minutes.

In the drawing, the small capacity condenser 7 connected in parallel to the auxiliary coil 4 is a condenser for facilitating starting. For the reactance element inserted in parallel with the lamp and in series with the glow lamp, it is necessary to insert said small capacity condenser 7 to facilitate the starting of the lamp.

Figure 2:
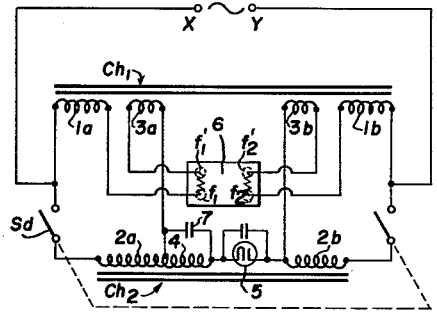

FIGURE 2 shows another embodiment of the invention wherein a dimming switch $Sd$ is provided in the circuit of FIGURE 1 so that two-stepped dimming of high output lighting and substantially rated output lighting may be made possible by turning on and off said dimming switch $Sd$. Thus, in this system, stepped dimmed lighting can be very economically made possible with the addition of only one switch.

Further, this dimming switch $Sd$ has also a feature that, even in the case of simultaneous lighting of a number of lights, the stepped dimmed lighting of high output lighting and substantially rated output lighting can be obtained simultaneously for all the lights by turning on and off the said switch.

The operation at the time of dimmed lighting or at the time of substantially rated output lighting is exactly the same as in the conventional standard fluorescent light circuit, and only one arc spot of the filament will be made. At the time of high output lighting, two arc spots will be produced in one filament.

Figure 3:
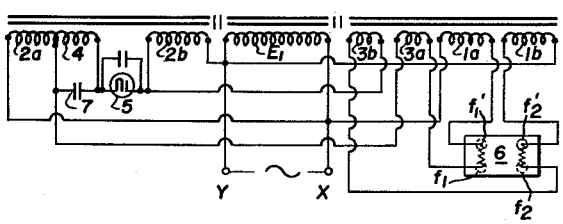

FIGURE 3 shows another embodiment of a high output lighting device according to the present invention of such leakage transformer type as will light at a high output a 40 w. fluorescent lamp (FL-40) from a 100 v. electric source. In this embodiment, the coils in FIGURE 1 are also used as the secondary coils. This is a high output lighting device of the leakage transformer type having two leakage by-paths. This is a modification of the circuit of FIGURE 1 and is exactly the same as FIGURE 1 in the fundamental operating mechanism.

Figure 4:
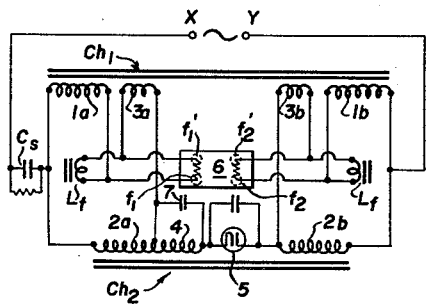

FIGURE 4 shows an embodiment of the present invention with the leading circuit of a flickerless circuit. The feature of this circuit is that a filament parallel choke $Lf$ consisting of a saturatable reactor construction is provided in parallel with each cathode filament of the lamp.

The feature of the operational effect of said choke $Lf$ added to said phase advancing circuit shall be detailed in the following.

In the lagging circuit of the high output lighting device shown in FIGURE 1, there will be no fatal defect in the operation in the normal lighting state and even in all occurrable abnormal states. However, on the leading circuit side in the flickerless ballast, there will be a fatal defect in such abnormal state. That is to say, in case only the fluorescent lamp is removed from the lighting fixture or in case the life of the lamp has ended and the filaments in both electrodes are fused and cut and are placed in the same state as if the lamp were removed, the glow lamp will still operate in such high output lighting device as of the present invention unlike the conventional standard fluorescent light circuit and will usually repeat the operation until it is fused so as not to be removable and is short-circuited. On the leading circuit side of the flickerless type ballast, the inductive reactance part of the circuit will increase in such abnormal state. Therefore, in the leading circuit, the impedance (as of the whole circuit) will decrease so greatly that an excessively large current will flow. Further, as said excessively large current will flow only on the side of one choke $ch_2$, said choke will be overheated and damaged. Furthermore, this excessively large current will raise the terminal voltage of the series condenser $Cs$ and will cause a danger of destruction of the insulation. In a high output lighting device, such abnormal state is highly probable to occur and can be said to be inevitable. The reason therefore is that, in the high output lighting device, as the lamp current is so selected as to be about 70% more than the value of the rated lamp current, the discharging energy will be so large that the lamp will be almost fused and cut at the time of the end of the life of the lamp. In the conventional standard fluorescent light circuit, if one electrode is fused and cut, the glow lamp will no longer operate and the fluorescent lamp will not be lighted again. However, in the high output lighting device, the glow lamp will still operate, therefore the lamp will be well lighted by only the preheating of one cathode, the discharge will be continued in the form of half-wave rectification, meanwhile the remaining cathode filament will be also fused and cut and at last there will be the same abnormal state as if the lamp were removed.

In the embodiment shown in FIGURE 4, said choke $Lf$ is added in parallel to the filament in order to remove the defect occurring in such abnormal state on the leading circuit side in a flickerless type high output lighting device. As said parallel choke $Lf$ is formed of a saturatable reactor construction and is is so designed as to have a characteristic that, in the range of small currents, it will have a very high impedance value but that, when the current is larger than a predetermined value, the iron core will be quickly saturated with magnetism and the impedance value will quickly decrease.

The problem of the design data of said choke $Lf$ shall be explained hereinunder.

As the filament of the lamp will cause an end glow at the time of preheating or short-circuiting of the starting switch 5, the filament voltage will be constant at about 10 v. and will not rise above this value even when the preheating current increases. Therefore, in the design of said choke, it is preferable to design such saturatable reactor in which, until the terminal voltage is about 13 v., the impedance will be very high but, when the voltage is higher than that, the iron core will quickly show a saturating characteristic. By making such choke $Lf$ as shown in FIGURE 3, such defects as the troubles of the damage of the ballast by heat and the puncture of the series condenser as caused in the abnormal state as stated above can be eliminated. That is to say, when the lamp is removed or when the filaments at both electrodes are fused and cut at the time of the end of the life of the lamp, in the conventional standard fluorescent lamp circuit, the starting switch will no longer operate but, in the high output lighting device, the starting switch will still operate and therefore the repetitive operation will be coninued until the switch is fused. In the high output lighting device of the lagging circuit, in such case, the impedance value of the circuit will increase, therefore the electric current will decrease, the ballast will operate at a very light load and so no trouble will be caused but, in the leading circuit, the condition will be quite reverse thereto. That is to say, in the leading circuit, if no filament parallel choke $Lf$ is added, the circuits of $1a$—$f_1$—$f_2$—$3a$ and of $1b$—$f_1'$—$f_2'$—$3b$ in FIGURE 4 will be opened in case of such abnormal state. Therefore, only the circuit $x$—$Cs$—$2a$—$4$—$5$—$2b$—$y$ will be connected so that the inductive reactance of this circuit will increase. However, as the capacitive reactance by the series condenser $Cs$ is constant, the impedance as of the whole of the circuit will greatly decrease and a very excessively large current will be produced. Further, as this excessively large current will flow through the circuit of only the choke $ch_1$, the fatal trouble of damage by heat will be caused. Said choke $Lf$ has the actions of short-circuiting the respective filament circuits in such abnormal state, preventing the increase of the inductive reactance of the circuit, preventing the great increase of the circuit current and thereby making the circuit current substantially the same as of the time of preheating the cathode in the normal state. Therefore, the defects of causing the troubles of the heat damage of the ballast and the puncture of the series condenser can be completely eliminated.

Figure 5:
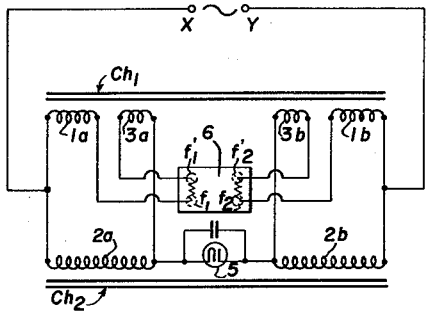

FIGURE 5 shows a circuit simplified by eliminating the starting auxiliary coil 4 in the circuit of FIGURE 1.

In this modified circuit, it is impossible to make smaller the input current at the time of preheating the cathode or the short-circuited current of the starting switch 5 than the input current during lighting or the lamp current, but the operation during lighting is exactly the same as the operation of the circuit of FIGURE 1. However, it is needless to say that the design data of each coil in this circuit must be reselected so as to be most suitable to this circuit.

Figure 6:
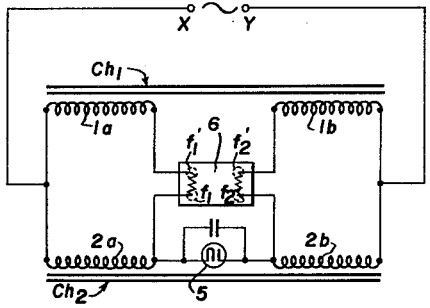

The embodiment shown in FIGURE 6 is a circuit system of the most economical high output lighting device made by further simplifying the circuit of FIGURE 5. That is to say, in this FIGURE 6, the coils $3a$ and $3b$ of the choke $ch_1$ in the circuit of FIGURE 5 are omitted. Therefore, the coils $1a$ and $1b$ of the choke $ch_1$ and the coils $2a$ and $2b$ of the choke $ch_2$ are redesigned so as to have the same impedance value and are selected to equalize the values of the distributed lamp currents flowing into the respective filament terminals during lighting. However, in general, in this circuit system, the cathode preheating current may be somewhat short. It is therefore preferable to fill the shortage of the cathode preheating current by making the choke $ch_1$ have a somewhat higher tendency of magnetic saturation than the choke $ch_2$ has.

Figure 7:
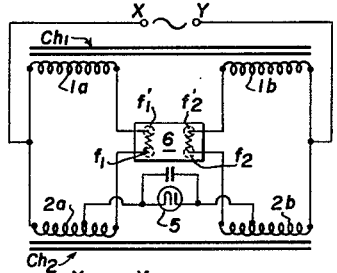

FIGURE 7 is of a modification of the circuit of FIGURE 6, wherein the starting switch 5 is connected between the intermediate terminals of proper winding points of the coils $2a$ and $2b$ of the choke $ch_2$ of FIGURE 6 so that, at the time of starting, the voltage of the electricity fed to the cathode preheating circuit may be temporarily raised so as to fill the shortage of the cathode preheating current for starting.

Figure 8:
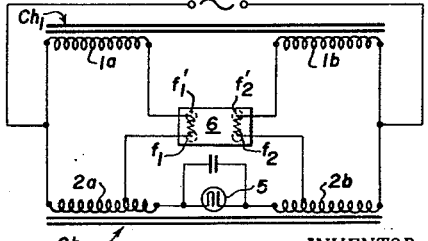

FIGURE 8 is shown the formal circuit being restricted the over cathode preheated current wherein the starting switch 5 is connected between the intermediate terminals of properly extended winding points of the coils 2a and 2b of the choke $ch_2$. It is needless to say that, in each of the embodiments shown in FIGURES 5, 6 and 7, if a dimming switch Sd is provided between the coils 2a and 2b and the electric sources x and y as shown in FIGURE 2, the two-stepped dimmed lighting of high output lighting and substantially rated output lighting can be readily obtained by turning on and off the dimming switch Sd.

Also, it is needless to say that each of the embodiments shown in FIGURES 5, 6 and 7 can be modified as a high output lighting device of a leakage transformer type by using the coils of each choke as for the secondary coils as in the embodiment shown in FIGURE 3.

What I claim is:

1. A high output lighting circuit for a gaseous discharge lamp of the type having a pair of spaced preheated filaments, said circuit comprising four choke elements of predetermined impedance, and a pair of power supply terminals, one of said terminals being connected to spaced points on one of said filaments through corresponding choke elements, the other of said terminals being connected to spaced points on the other of said filaments through the remaining choke elements, respectively, whereby two parallel paths are formed between said terminals through said choke elements and the discharge space separating corresponding points on said filaments, so that after said lamp is started, properly distributed discharge currents flow along said paths and form two arc spots at each of said filaments, and starting switch means shunting said lamp, said switch means electrically coupling said filaments to provide for heating the same and electrically isolating the filaments to provide for discharge therebetween.

2. The circuit of claim 1, further comprising a condenser connected in series with said lamp between said terminals, and a pair of inductances connected across the respective filaments.

3. The circuit of claim 1, said starting switch means being directly connected between ends of said filaments.

4. The circuit of claim 1, said starting switch means being connected to taps on a pair of said choke elements associated with the respective filaments.

5. The circuit of claim 1, two of said choke elements each having an auxiliary coil, each said coils being connected in series between another of said choke elements and its point of connection to a filament.

6. The circuit of claim 1, one of said choke elements having an extension coil, and said starting switch means being connected between the end of said extension coil and the end of another of said choke elements.

7. The circuit of claim 1, two of said choke elements having auxiliary coils, said auxiliary coils being connected, respectively, between ends of the third and fourth choke elements and their points of connection to a filament, the third choke element having an extension coil in series therewith, and said starting switch means being connected between the end of said extension coil and the end of the fourth choke element.

8. The circuit of claim 1, further comprising a pair of dimming switches for disconnecting the choke elements of one of said parallel paths from the respective power supply terminals.

9. An electrical circuit comprising power supply terminals, double-ended filaments, a first set of parallel coils connecting one of said terminals to the ends of one of the filaments, a second set of parallel coils connecting the other of said terminals to the ends of the other of said filaments, and switch means connected between one end of one of said filaments and one end of the other of said filaments, said switch means electrically coupling said filaments to provide for heating the latter and electrically isolating the filaments to provide for discharge therebetween.

References Cited in the file of this patent

UNITED STATES PATENTS

| 2,466,053 | Shaper | Apr. 5, 1949 |
| 2,513,840 | Berland | July 4, 1950 |
| 2,830,232 | Carpenter et al. | Apr. 8, 1958 |

FOREIGN PATENTS

| 650,992 | Great Britain | Mar. 7, 1951 |